United States Patent
Russell

Patent Number: 5,577,289
Date of Patent: Nov. 26, 1996

[54] SCRUBBER MAT DEVICE WITH DUAL ABRASIVE SURFACE FOR SINK DIVIDER WALL

[76] Inventor: Margaret R. Russell, 6209 Pernod, St. Louis, Mo. 63139

[21] Appl. No.: 509,511

[22] Filed: Jul. 31, 1995

[51] Int. Cl.$^6$ .................. A47L 23/24; B32B 3/06
[52] U.S. Cl. .............. 15/114; 15/160; 15/210.1; 15/218.1; 15/215; 15/229.12; 4/657; 4/581
[58] Field of Search .................. 15/210.1, 215, 15/216, 217, 229.11, 229.12, 229.13, 114, 209.1, 218.1, 244.1, 244.3, 160, 161; 296/97.23; 4/657, 581

[56] References Cited

U.S. PATENT DOCUMENTS

| | | | |
|---|---|---|---|
| 1,954,940 | 4/1934 | Mikel | 15/215 |
| 2,230,312 | 2/1941 | Sieb et al. | 15/229.11 |
| 2,308,405 | 1/1943 | Tully | 15/229.12 |
| 2,667,654 | 2/1954 | Peterson | 15/215 |
| 2,735,434 | 2/1956 | De Rossett | 15/215 |
| 2,886,841 | 5/1959 | Wilcox | 15/210.1 |
| 2,908,027 | 10/1959 | McClung | 15/217 |
| 3,050,764 | 8/1962 | Schmieder et al. | 15/229.12 |
| 3,185,604 | 5/1965 | Cameron | 15/229.12 |
| 3,467,391 | 9/1969 | Elesh | 15/217 |
| 3,648,320 | 3/1972 | Woolley | 15/217 |

FOREIGN PATENT DOCUMENTS

899017  6/1962  United Kingdom ............. 15/229.12

*Primary Examiner*—Gary K. Graham

[57] ABSTRACT

A flexible rubber-like device that will conform to the divider wall of a kitchen- or wet-bar sink and providing an attached scrubber pad for the purpose of single-handedly cleaning utensils or flat objects such as knives, forks, scrapers, plastic or metal blades or spatula blades and paint scrapers and putty knife blades. The device can be used for cleaning bakery cake-decorating spreader-knives, demonstrator's knives, painter's stirring utensils and laboratory tools. The device will adhere securely to the divider wall as it becomes wet from running water. The device will assist in cleaning kitchen utensils, tools, paint scrapers, or any flatware that may be sensibly scraped in water and on a scrubber.

1 Claim, 1 Drawing Sheet

5,577,289

SCRUBBER MAT DEVICE WITH DUAL ABRASIVE SURFACE FOR SINK DIVIDER WALL

BACKGROUND OF THE INVENTION

This invention relates to a scrubber mat device for a sink divider wall. More particularly, the invention relates to a flexible mat which will conform to the divider wall of a sink such as a kitchen- or wet-bar sink and which has an attached scrubber pad for cleaning kitchen utensils and like implements.

In the cleaning and washing of kitchen utensils such as knives, forks, scrapers or other household or laboratory utensils such as plastic blades, metal blades, cake-decorating spreaders, spatulas, paint scrapers and putty knife blades, it is common practice to utilize steel wool pads or other such abrasive devices to scrub or scour the food particles or waste materials that adhere firmly to the utensils. This cleaning operation often necessitates the manual reaching for the scrubbing device on a counter or shelf adjacent to the sink and then replacing it upon completion of the scrubbing. It also requires the simultaneous use of both hands, one to hold the scrubbing device and the other to hold the utensil to be cleaned. When many such utensils are required to be cleaned, the scrubbing operation is inconvenient and can add considerable time to the total time for cleaning these utensils.

BRIEF DESCRIPTION OF THE INVENTION

In accordance with the present invention, a novel scrubber mat device for a sink divider wall is provided. In general, the scrubber mat is an essentially flat, flexible device which readily conforms to both sides of the divider wall of a so-called double sink. The scrubber mat device can also lie on the floor or bottom of a sink bowl, or can be placed over the top edge of a sink bowl. A portion of the scrubber mat device has a built-in scrubber pad which is especially adapted for positioning on top of the sink divider wall as the scrubber mat device is draped over the sink divider wall.

The scrubber mat device will adhere to the side walls of the sink divider as it becomes wet from the running water discharged into the sink from a faucet for washing of the utensils.

The scrubber pad has an outer abrasive or tufted surface upon which the kitchen utensils and other flatware can be scraped during the cleaning operation.

The scrubber mat device can be utilized by use of only one hand for cleaning utensils, thereby freeing the other hand for other functions.

Running water from the sink faucet can be used in conjunction with the scraping motion of the utensils on the scrubber pad to assist in the cleaning of the utensils.

The scrubber mat device thus provides a convenient method for cleaning utensils to which food particles and other such residues have adhered, without the need to intermittently reach for a scouring pad and replace the pad to the counter or shelf from which it is obtained.

DETAILED DESCRIPTION OF THE INVENTION

While the specification concludes with claims particularly pointing out and distinctly claiming the subject matter which is regarded as forming the present invention, it is believed that the invention will be better understood from the following detailed description of preferred embodiments taken in conjunction with the appended drawings in which:

Figure 1:
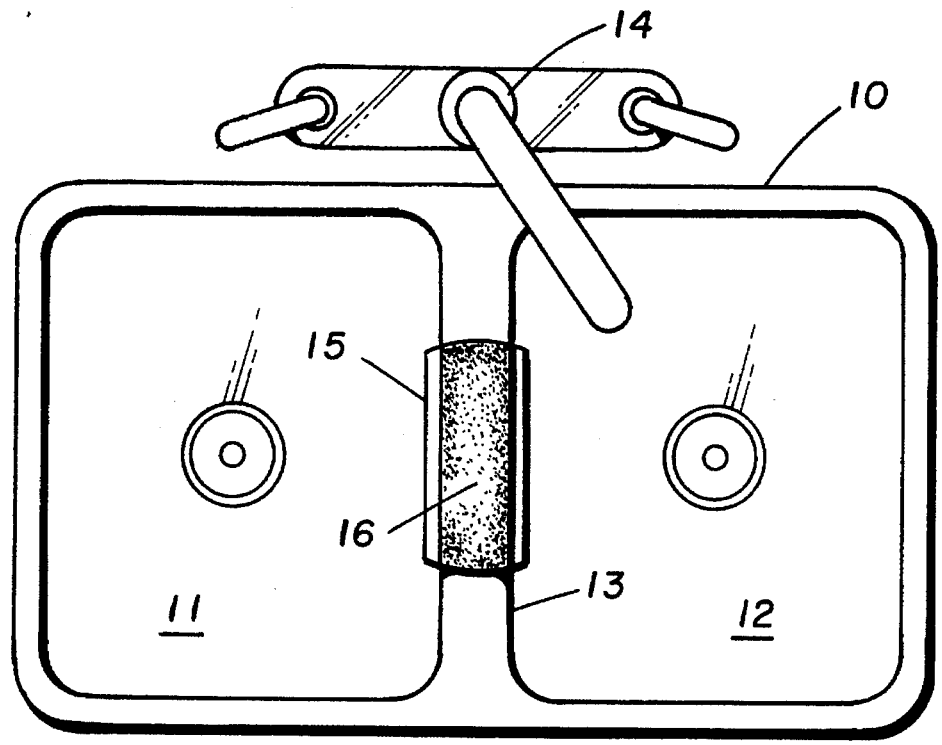
FIG. 1 is a top view of a double sink with the scrubber mat device in an embodiment of the invention positioned over the divider wall of said sink.

As can be seen from FIG. 1, double sink 10 contains a pair of sink bowls 11 and 12, and a divider wall 13 positioned midway between said bowls. A faucet 14, preferably with a movable arm, is conveniently located adjacent to the sink for discharging water into either bowl of said sink. A scrubbing mat 15 having a scrubber pad 16 in one embodiment of the invention is shown to be draped over said divider wall.

Figure 2:
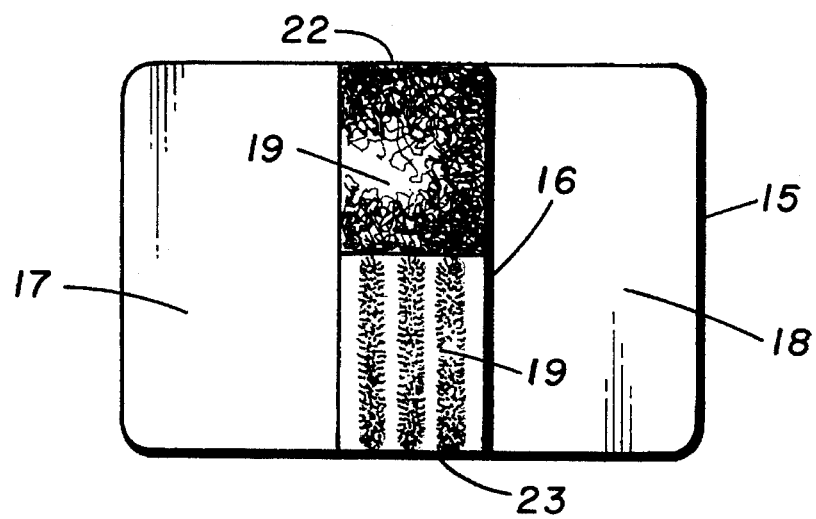
FIG. 2 is a top view of the scrubber mat device of the invention in a spread position and adapted for use by positioning over the divider wall of the double sink as shown in FIG. 1.
Figure 3:
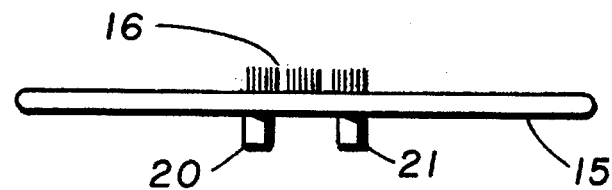
FIG. 3 is a side view of the scrubber mat device of FIG. 2.

As seen in greater detail from FIGS. 2 and 3, the scrubbing mat 15 is an essentially flat and relatively thin device which is adapted for placement over sink divider wall 13 and is made of a flexible material such that ends 17 and 18 of the mat will adhere securely to the inner sides of said divider wall. The scrubber pad 16 is positioned generally in the center of mat 15 and has an abrasive or tufted outer surface 19 upon which the utensils can be scraped in the cleaning operation.

The scrubbing mat 15 can be made of conventional flexible, thermoplastic materials such as natural or synthetic rubber, and plastics such as polyvinyl chloride, polyethylene, polypropylene and the like. Polyisoprene rubber or a common general purpose rubber such as styrene-butadiene rubber are illustrative of the preferred synthetic rubber materials. The flexible material will also generally contain plasticizers, stabilizers, lubricants and pigments.

Preferably, the scrubbing mat 15 comprises a thin rubber-like sheet about one to ten mm thick having a top surface of about two to ten inches in width if round or square, or about 2–10 inches×5–20 inches if oblong.

Conventional methods of forming the scrubbing mat 15 can be employed. For example, rubber compounding such as compression molding is well-known in the arts as can be seen from Kirk-Othmer, *Encyclopedia of Chemical Technology*, Vol. 20, Third Edition, 1983, pp. 365–468, John Wiley & Sons. Plastics processing such as, e.g., by extrusion and molding, is conventional technology as can be seen from Kirk-Othmer, Ibid., Vol. 18, 1982, pp. 184–206.

The scrubber pad 16 outer surface can consist of nylon bristles or tufts or an abrasive plastic or metallic material having the consistency of steel wool. The scrubber pad can also be provided with a dual surface which is constructed at one end 22 with a relatively strongly abrasive material such as steel wool and at the other end 23 with a relatively softly abrasive material such as soft nylon bristles or tufts.

The scrubber pad 16 can be affixed to the scrubbing mat 15 such as by use of a strong adhesive, e.g., epoxy, but preferably by ultrasonic welding. Ultrasonic welding of thermoplastics produces excellent weld strength, does not require skilled operators and can be easily automated. See, e.g., Kirk-Othmer, Ibid., Vol. 23, 1983, pp. 470–472.

For convenient placement and retention of the scrubber pad 16 over the divider wall 13 at the start of the cleaning operation, said scrubber pad may be conveniently positioned between a pair of longitudinal guide ribs 20 and 21 molded into the bottom side of mat 15, which will then serve as a guide for centering of said pad 16 over the top of said divider wall 13 and facilitating its retention in this position during the cleaning operation. Alternatively, a pair of spaced-apart, downwardly-depending nubs can be used in place of each of ribs 20 and 21. These ribs or nubs are spaced apart about the width of the divider wall 13.

The embodiment of the invention with the guide ribs 20 and 21 is especially adapted to provide positioning and gripping strength to maintain the position of said scrubber mat device while in use for the cleaning of viscous materials or gluey, gummy, pasty, or tacky adhesive-type matter from said utensils or flat objects.

In general, the scrubber pad 16 will have a width corresponding approximately to the width of the top of the divider wall 13. The scrubber pad 16 can have a length corresponding to the full length of the top of the divider wall 13 or only a portion thereof as shown in the embodiment of FIG. 1.

Various other examples will be apparent to the person skilled in the art after reading the present disclosure without departing from the spirit and scope of the invention. It will be understood that all such other examples are included within the scope of the appended claims.

What is claimed is:

1. A scrubber mat device for cleaning utensils, said device adapted for positioning over a divider wall of a double bowl sink, said device comprising:

a flexible, thermoplastic sheet having a top surface, a bottom surface and first and second ends, said sheet is adapted to conform to said divider wall of said sink when placed thereover such that said first and second ends lie on opposite sides of said divider wall;

means for engaging said divider wall of said sink, said means comprising a pair of elongated, laterally spaced ribs extending from the bottom surface of said sheet;

an elongated abrasive pad having first and second ends and a width, said pad having steel wool at said first end to define a first abrasiveness and bristles at said second end to define a second different abrasiveness, said pad is attached to said top surface of said sheet opposite the spacing between said ribs and substantially parallel to said ribs, said width of said pad is approximately equal to the spacing between said ribs.

\* \* \* \* \*